(12) United States Patent
Klein (10) Patent No.: US 6,957,440 B2
(45) Date of Patent: Oct. 18, 2005

(54) METHODS FOR TRANSLATING AND READING OPTICAL DISKS

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 10/727,298

(22) Filed: Dec. 3, 2003

(65) Prior Publication Data

US 2004/0109392 A1 Jun. 10, 2004

Related U.S. Application Data

(62) Division of application No. 10/330,807, filed on Dec. 26, 2002, now Pat. No. 6,707,769, which is a continuation of application No. 09/200,320, filed on Nov. 25, 1998, now Pat. No. 6,603,715.

(51) Int. Cl.[7] .................. G11B 17/03; G11B 17/04; G11B 33/02
(52) U.S. Cl. ...................................... 720/600
(58) Field of Search ............... 720/600, 652, 720/619, 617; 369/77.11, 75.11, 77.1, 75.1, 30.5, 30.62, 30.79, 30.85, 30.86, 30.9, 30.76, 30.94

(56) References Cited

U.S. PATENT DOCUMENTS

| | | | |
|---|---|---|---|
| 1,799,148 A | 4/1931 | Bryant | 369/37.01 |
| 1,955,939 A | 4/1934 | Bishop | 369/192.1 |
| 2,937,026 A | 5/1960 | Acker | 369/37.01 |
| 3,100,644 A | 8/1963 | Osborne et al. | 369/37.01 |
| 3,165,321 A | 1/1965 | Osborne et al. | 369/37.01 |
| 4,286,790 A | 9/1981 | Siryj et al. | 369/30.49 |
| 4,416,003 A | 11/1983 | Suzuki | 369/75.21 |
| 4,504,934 A | 3/1985 | Tanaka et al. | 369/18 |
| 4,519,055 A | 5/1985 | Gilson | 369/30.71 |
| 4,580,254 A | 4/1986 | Hojyo et al. | 369/30.29 |
| 4,800,999 A | 1/1989 | Matsuo | 198/370.07 |
| 4,807,208 A | 2/1989 | Geiger | 369/30.89 |
| 4,855,980 A | 8/1989 | Hug et al. | 369/30.49 |
| 4,910,619 A | 3/1990 | Suzuki et al. | 360/92 |
| 4,972,778 A | 11/1990 | Suominen | 104/183 |
| 5,027,335 A * | 6/1991 | Deis | 369/30.77 |
| 5,036,503 A | 7/1991 | Tomita | 369/30.43 |
| 5,067,116 A | 11/1991 | Kadrmas | 369/30.86 |
| 5,081,618 A | 1/1992 | Abe | 369/244 |
| 5,099,465 A | 3/1992 | Geiger et al. | 369/30.34 |
| 5,128,912 A | 7/1992 | Hug et al. | 369/30.61 |
| 5,153,862 A | 10/1992 | Taylor et al. | 369/30.45 |
| 5,157,648 A | 10/1992 | Okamoto et al. | 369/75.21 |
| 5,214,628 A | 5/1993 | Langman et al. | 369/30.86 |
| 5,235,575 A | 8/1993 | Han | 369/30.27 |
| 5,235,579 A | 8/1993 | Ross | 369/30.56 |
| 5,257,111 A | 10/1993 | Kakuyama | 386/125 |
| 5,293,284 A | 3/1994 | Sato et al. | 360/92 |

(Continued)

FOREIGN PATENT DOCUMENTS

| | | | |
|---|---|---|---|
| JP | 59-030263 A | | 2/1984 |
| JP | 1-237952 | * | 9/1989 |
| JP | 4-022441 Y2 | | 1/1992 |

OTHER PUBLICATIONS

"General DVD", http://www.videodiscover.com/vdyweb/dvd/dvdfaq.html#1.1, p. 4, retrieved from the Internet on Oct. 1, 1998.

Primary Examiner—Julie Anne Watko
(74) Attorney, Agent, or Firm—Perkins Coie LLP (57) ABSTRACT

The present disclosure provides apparatus and methods for reading optical disks. Some implementations are particularly well suited for automatically playing both sides of a dual-sided optical disk. By coordinated delivery of disks between a disk reader, a disk transfer mechanism, or a disk turner and a carrousel that is approximately toroid shaped, both sides of a dual-sided optical disk can be automatically accessed.

11 Claims, 7 Drawing Sheets

U.S. PATENT DOCUMENTS

| | | | |
|---|---|---|---|
| 5,311,497 A | 5/1994 | Takizawa et al. | 369/219 |
| 5,434,678 A | 7/1995 | Abecassis | 386/52 |
| 5,448,373 A | 9/1995 | Kim | 386/125 |
| 5,502,697 A | 3/1996 | Taki | 369/30.33 |
| 5,502,703 A | 3/1996 | Yamada et al. | 369/47.54 |
| 5,506,830 A | 4/1996 | Ohishi et al. | 369/249 |
| 5,528,566 A | 6/1996 | McGee et al. | 369/30.86 |
| 5,559,776 A | 9/1996 | Ikenaga | 369/47.1 |
| 5,561,657 A | 10/1996 | Ogawa | 369/179 |
| 5,586,094 A | 12/1996 | Pines et al. | 369/30.85 |
| 5,610,882 A | 3/1997 | Dang | 369/30.43 |
| 5,613,745 A | 3/1997 | Cho et al. | 312/9.9 |
| 5,615,184 A | 3/1997 | Tsuruta et al. | 369/30.86 |
| 5,631,785 A | 5/1997 | Dang et al. | 360/92 |
| 5,671,196 A | 9/1997 | Yoshida et al. | 369/30.33 |
| 5,675,390 A | 10/1997 | Schindler et al. | 715/717 |
| 5,680,377 A | 10/1997 | Dang et al. | 369/30.44 |
| 5,682,364 A | 10/1997 | Ogawa | 369/30.81 |
| 5,689,490 A | 11/1997 | Pollard | 369/77.2 |
| 5,692,878 A | 12/1997 | Freund | 414/796.6 |
| 5,699,281 A | 12/1997 | Crucius et al. | 702/159 |
| 5,719,725 A | 2/1998 | Nakao | 360/98.06 |
| 5,742,570 A | 4/1998 | Taki et al. | 369/30.63 |
| 5,748,585 A | 5/1998 | Tsukamoto et al. | 369/47.23 |
| 5,754,502 A | 5/1998 | Kamemura | 369/30.77 |
| 5,761,160 A | 6/1998 | Sanada | 369/30.11 |
| 5,841,744 A | 11/1998 | Menke et al. | 369/30.85 |
| 5,852,593 A | 12/1998 | Ishida et al. | 369/53.18 |
| 5,923,638 A | 7/1999 | Watanabe | 369/192 |
| 5,959,958 A | 9/1999 | Inatani et al. | 369/30.85 |
| 5,982,719 A | 11/1999 | Nishijima et al. | 369/30.32 |
| 5,995,320 A | 11/1999 | Ostwald | 360/92 |
| 5,995,459 A | 11/1999 | Kappel et al. | 369/30.55 |
| 6,041,026 A | 3/2000 | Hammar et al. | 369/30.43 |
| 6,064,544 A | 5/2000 | Wada | 360/92 |
| 6,212,139 B1 | 4/2001 | Nakamura | 369/30.85 |
| 6,504,798 B1 | 1/2003 | Revis | 369/30.23 |
| 6,587,405 B1 | 7/2003 | Klein | 369/30.59 |
| 6,603,715 B1 | 8/2003 | Klein | 369/30.86 |
| 2003/0090966 A1 | 5/2003 | Klein | 369/30.86 |
| 2004/0105356 A1 | 6/2004 | Klein | 369/30.85 |

* cited by examiner

METHODS FOR TRANSLATING AND READING OPTICAL DISKS

CROSS-REFERENCE TO RELATED APPLICATIONS

This application is a divisional application of U.S. patent application Ser. No. 10/330,807, entitled "METHODS FOR TRANSLATING AND READING OPTICAL DISKS," filed Dec. 26, 2002, now U.S. Pat. No. 6,707,769, issued on Mar. 16, 2004, which is a continuation of U.S. patent application Ser. No. 09/200,320, entitled "OPTICAL DISK CHANGER WITH SIDE SWITCHING CAPABILITIES," filed Nov. 25, 1998, now U.S. Pat. No. 6,603,715, issued Aug. 5, 2003, both of which are incorporated herein by reference in their entireties. The subject matter of U.S. patent application Ser. No. 09/199,768 entitled "LINEAR OPTICAL DISK CHANGER WITH SIDE SWITCHING CAPABILITIES," filed Nov. 25, 1998, now U.S. Pat. No. 6,587,405, issued Jul. 1, 2003, contains related subject matter.

TECHNICAL FIELD

The present invention is directed toward an apparatus and method for automatically accessing both sides of an optical disk.

BACKGROUND OF THE INVENTION

Data of various types is recorded on and accessed from optical disks. Common optical disks include compact disks (CDs), CD-ROMs, digital versatile disks (DVDs), digital video disks (also abbreviated DVDs), or other similar disks. Some optical disks, such as DVDs, may be either single-sided or dual-sided. With conventional optical disk changers, a dual-sided optical disk must be manually "flipped" between sides in order to read data from both sides of the disk.

Three general types of optical disk changers capable of storing and reading multiple disks are known. In the first type, a number of disks are positioned coplanar to one another and radially about a center rotation point on a carrousel. To read any one disk, the carrousel is rotated until the desired disk is positioned adjacent to the disk reader. To read another disk, the present disk is disengaged from the reader and the carrousel is rotated to position another disk adjacent to the disk reader. However, such optical disk changers read only one side of a disk. Thus, operator intervention is required to flip the disk to allow the disk reader to read the opposite side of the disk.

The second type of multiple disk changer stores optical disks in a stack with the center of each disk coaxial with the centers of the other disks. A disk to be read is rotated or translated out from the stack and engaged by a disk reader. Just as with the first type of multiple disk changer, the changer can read only one side of a disk unless the disk is manually flipped by a user.

The third type of multiple disk changer stores optical disks radially about a center rotation point on a carrousel, but with the rotational axis of each optical disk perpendicular to the axis of rotation of the carrousel. The resulting geometry of the plurality of stored disks is a toroid or "donut" shape. A disk from the carrousel is read by ejecting the disk from the carrousel into a disk reader. Examples of this third type of multiple disk changer are illustrated in U.S. Pat. Nos. 4,519,055, 5,067,116, 5,235,579, 5,615,184, 6,671,196, 5,719,725, and 5,754,502. These changers can only read one side of the optical disk unless the user manually flips the disk.

Therefore, although the prior art is capable of storing a large number of optical disks, the prior art does not provide an apparatus or method for reading both sides of a optical disk without manual operator intervention. Consequently, there is a need for an apparatus and method for automatically reading both sides of an optical disk by effectively flipping a dual-sided disk.

SUMMARY OF THE INVENTION

One embodiment of the invention is an optical disk changer for reading a first and a second side of an optical disk. The disk changer includes: a base; a carrousel rotationally coupled to said base for receiving, holding, and delivering the optical disk; and an optical disk reader attached to said base within said carrousel. The optical disk reader has a first loading mechanism on a first side of said reader and a second loading mechanism on a second side of said reader. The first loading mechanism loads the optical disk when the first side of the optical disk is read and the second loading mechanism loads the optical disk when the second side of the optical disk is read.

Another embodiment of the invention is a method of translating an optical disk having a first side and a second side. The method includes holding the optical disk in a carrousel. If data from the first side of the optical disk is to be read, then the optical disk is translated to a location within the carrousel in a first direction. If data from the second side of the optical disk is to be read, then the optical disk is translated to the location in a direction opposite to the first direction.

Another embodiment of the invention is a method of reading data from an optical disk comprising: holding the optical disk in a carrousel; delivering the optical disk from the carrousel to a location within the carrousel by translating the optical disk in a first direction; reading data from a first side of the optical disk; delivering the optical disk from the location to the carrousel by translating the optical disk in the first direction; rotating the carrousel; loading the optical disk from the carrousel to the location within the carrousel by translating the optical disk in the first direction; and reading data from a second side of the optical disk.

Another embodiment of the invention is an optical disk changer for reading a first and a second side of at least one optical disk comprising: a base; a carrousel rotationally coupled to said base for receiving, holding, and delivering at least one optical disk; an optical disk reader attached to said base outside of said carrousel; and a transfer mechanism coupled to said base within said carrousel. The transfer mechanism has a first loading mechanism on a first side of said transfer mechanism for loading the optical disk into said transfer mechanism and a second loading mechanism on a second side of said transfer mechanism for loading the optical disk into said carrousel.

Yet another embodiment of the invention is a method of reading data from an optical disk comprising: holding the optical disk in a carrousel; if data from the first side of the optical disk is to be read, then delivering the optical disk to an optical reader and reading the data; and if data from the second side of the optical disk is to be read, then delivering the optical disk to a transfer mechanism along a first direction, delivering the optical disk to the carrousel along the first direction, delivering the optical disk to the optical reader, and reading the data.

Still another embodiment of the invention is an optical disk changer for reading a first and a second side of an optical disk comprising: a base; a carrousel rotationally coupled to said base for receiving, holding, and delivering the optical disk; an optical disk turner rotationally coupled to said base within said carrousel for turning the optical disk, said turner having a first loading mechanism on a first side of said turner and a second loading mechanism on a second side of said turner, the first loading mechanism for loading the optical disk into said turner and the second loading mechanism for loading the optical disk into said carrousel after said turner has been rotated relative to said carrousel; and an optical disk reader attached to said base outside of said carrousel for reading the first side of the optical disk, and for reading the second side of the optical disk that has been turned by said optical disk turner.

Another embodiment of the invention is a method of reading data from an optical disk comprising: holding the optical disk in a carrousel; if data from the first side of the optical disk is to be read, then delivering the optical disk to an optical reader and reading the data; and if data from the second side of the optical disk is to be read, then delivering the optical disk to a turning mechanism, rotating the optical disk, delivering the optical disk to the carrousel, delivering the optical disk to the optical reader, and reading the data.

DETAILED DESCRIPTION OF THE INVENTION

Embodiments of the present invention are directed toward an optical disk changer that is capable of automatically playing both sides of a dual-sided optical disk. The optical disk played may be a CD, CD-ROM, DVD, or any other such optical disk. In one embodiment of the invention, a carrousel is employed to receive, hold, and deliver optical disks to an optical disk reader located in the center of the carrousel. Another embodiment of the invention positions a reader adjacent to the carrousel, but outside of the center of the carrousel. This embodiment uses a stationary transfer mechanism to pass optical disks through the center of the carrousel. Still another embodiment of the invention also places the reader adjacent to, but outside of the carrousel. This embodiment uses an optical disk turner to turn and direct disks to desired slots of the carrousel.

Description of the First Embodiment

Figure 1:
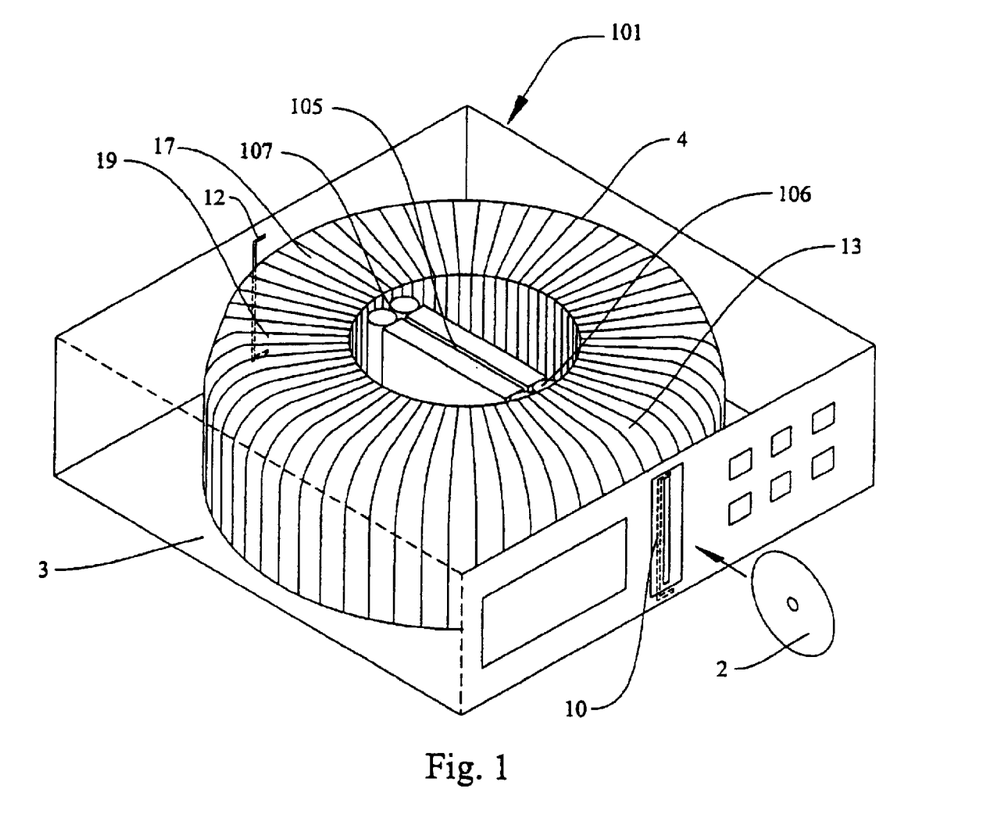
FIG. 1 is a top isometric view of an optical disk changer with a disk reader within the disk carrousel.

FIG. 1 shows an optical disk changer 101 for reading a first and a second side of an optical disk 2. A base 3 supports a carrousel 4.

Carrousel

As shown in FIG. 1, the carrousel 4 is rotationally coupled to the base 3. The carrousel 4 has slots for holding optical disks radially about a center rotation point of the carrousel. The walls of these slots should be of sufficient stiffness so that they properly support the optical disks. In some embodiments, walls of the slots are of constant thickness. In such embodiments, the slots would not be of constant thickness. In other embodiments, the slots are of constant thickness. In such embodiments, the thickness of the walls along the inner diameter of the carrousel 4 would be less than the thickness of the walls along the outer diameter of the carrousel 4. Exemplary slots are shown as slots 13, 17, and 19. As is evident from FIG. 1, the carrousel 4 stores disks radially about a center rotation point of the carrousel with the rotational axis of each optical disk substantially perpendicular to the axis of rotation of the carrousel 4.

The carrousel 4 may also include locating surfaces along the bottom of the slots (not shown). These locating surfaces properly position an optical disk that is received by a user or a disk reader. In addition, the locating surfaces also keep an optical disk that is being held in a carrousel 4 from exiting a slot in the carrousel 4 when the carrousel 4 rotates. Further, these locating surfaces provide a precise position for an optical disk that is to be delivered to a disk reader. Locating surfaces are known in the art.

The carrousel 4 may be constructed from a variety of materials. However, it may be optimal to mold the carrousel 4 from plastic.

Optical Disk Reader

Referring again to FIG. 1, an optical disk reader 105 is shown. As shown in FIG. 1, the optical disk reader 105 is located "within" the carrousel 4, i.e., at least a portion of the disk reader 105 is located in the volume defined by the inner edges of the slots of the carrousel 4. The optical disk reader 105 includes conventional sensors and electronics for reading an optical disk. In addition, the reader 105 includes a first loading mechanism 106 that is located on a first side of the reader 105. The first loading mechanism 106 may be formed by two substantially parallel cylinders that cooperatively rotate to move the optical disk.

In the embodiment shown in FIG. 1, the first loading mechanism 106 also includes a first ejector arm 10. The first ejector arm 10 may rotate in a bearing or retaining clip about its lower end to push a disk out of the slot 13 and into the grasp of the substantially parallel cylinders of the first loading mechanism 106. Alternatively, the first ejector arm 10 may rotate about its upper end or may even be coupled to a mechanism that translates the entire ejector arm 10. In addition, other conventional loading mechanisms may be used. Any loading mechanism that loads the disk 2 from the carrousel 4 into the reader 105 with or without use of an ejector arm will suffice.

The disk reader 105 also contains a second loading mechanism 107 on the second side of the disk reader 105. This loading mechanism is similar to the first loading mechanism. Similar to the first ejector arm 10, a second ejector arm 12 cooperates with the second loading mechanism 107 to load an optical disk from the second side of the disk reader 105.

Method of Operating the First Embodiment of the Invention

Figure 4:
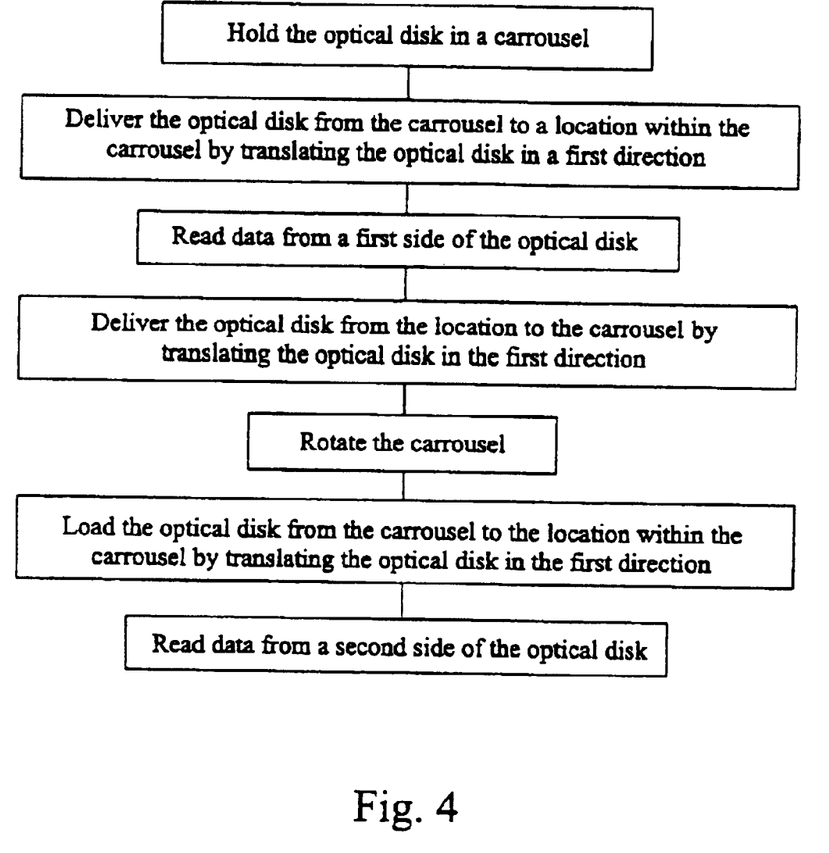
FIG. 4 is a flowchart illustrating a method of reading data from an optical disk.

One embodiment of the invention is a method of reading data from an optical disk. This method, which is shown in FIG. 4, may be performed by the disk changer 101 shown in FIG. 1. First, an optical disk that is being held in a carrousel is delivered from the carrousel into a reader within the carrousel by translating the disk in a first direction.

Next, data from a first side of the disk is read. After data from the first side of the disk is read or upon operator command, the disk is unloaded from the reader and delivered to the carrousel by translating the disk in the first direction. In some embodiments, the carrousel is rotated one hundred eighty degrees so that the optical disk is delivered into the slot in the carrousel that originally held the disk. In other embodiments, the disk is delivered to another empty slot in the carrousel. The carrousel is then rotated. In some embodiments, the carrousel will be rotated one hundred eighty degrees. Next, the disk is loaded from the carrousel to the reader by translating the optical disk in the first direction.

Then, data from the second side of the optical disk may be read. After data from the second side of the disk is read or upon operator command, the disk is unloaded from the reader and delivered in the first direction from the location within the carrousel back into the carrousel by the second disk loading mechanism.

Another Method of Operating the First Embodiment of the Invention

Figure 5:
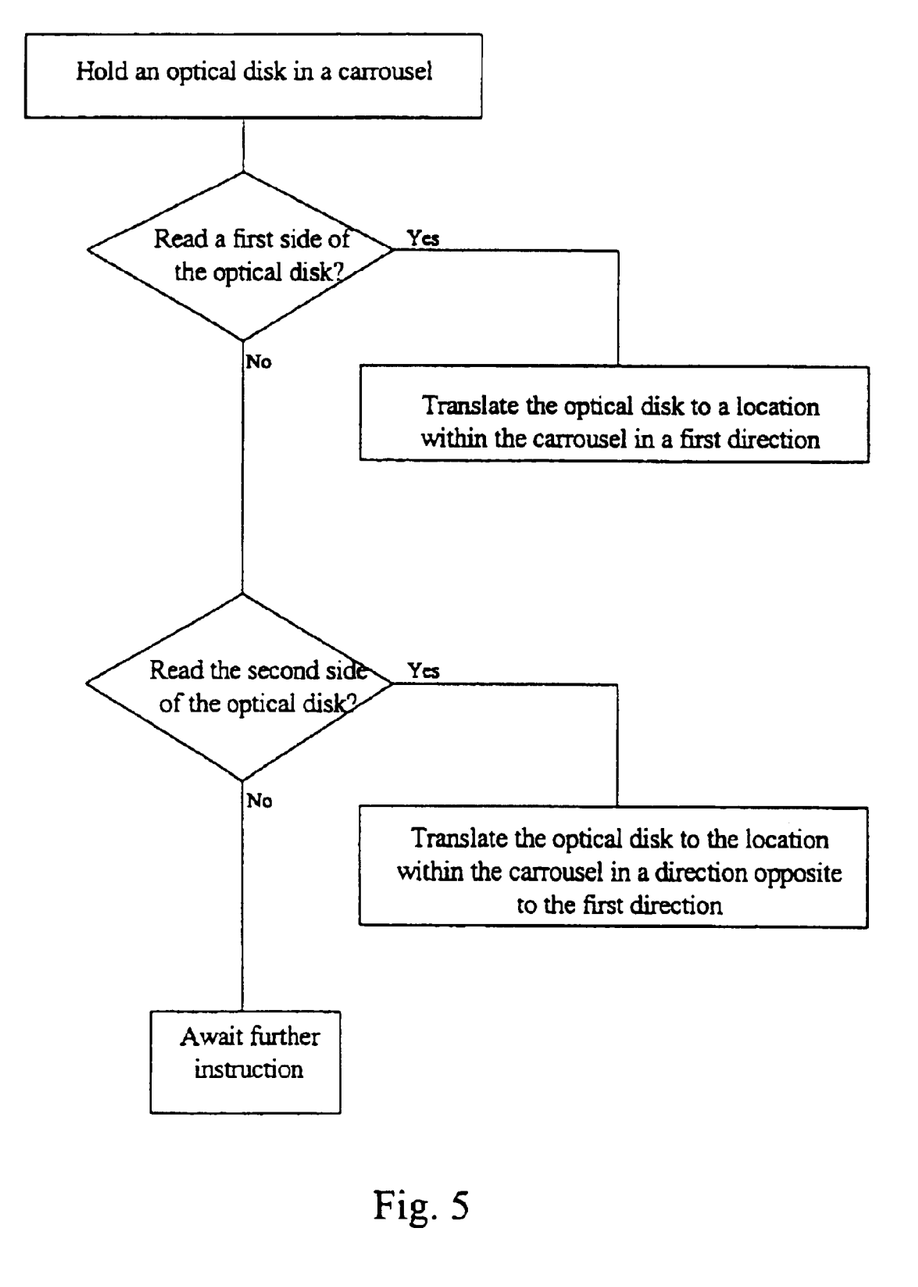
FIG. 5 is a flowchart illustrating a method of translating an optical disk.

Another embodiment of the invention is shown in FIG. 5. In this embodiment, an optical disk is held in a carrousel. If data from the first side of the optical disk is to be read, then the carrousel is rotated to align the disk with the first transfer mechanism. Then, the optical disk is delivered to the disk reader by translating the disk in a first direction. After reading the data on the first side of the disk, the disk may be delivered to the carrousel by translating the disk in a direction opposite to the first direction.

On the other hand, if data from the second side of the optical disk is to be read, then the carrousel is rotated to align the disk with the second transfer mechanism. Then, the optical disk is delivered to the disk reader by translating the optical disk to the disk reader in a direction opposite to the first direction. After reading the data on the second side of the disk, the disk may be delivered to the carrousel by translating the disk in the first direction.

Description of the Second Embodiment

Figure 2:
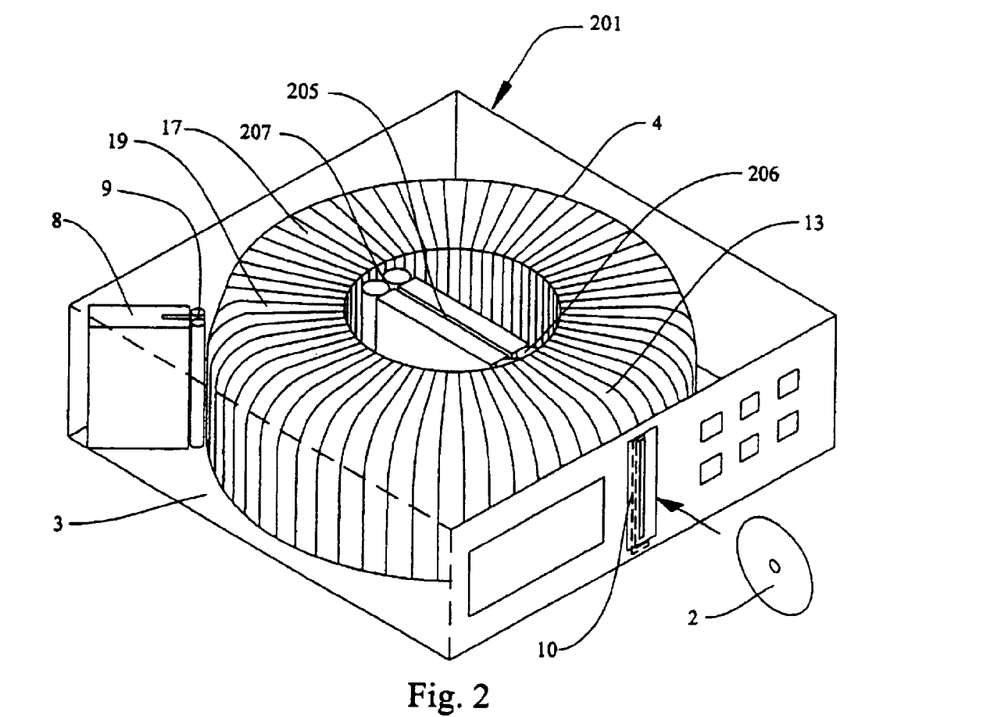
FIG. 2 is a top isometric view of an optical disk changer with a transfer mechanism within the disk carrousel.

FIG. 2 shows an optical disk changer 201 for reading a first and a second side of an optical disk 2. As in the first embodiment, a base 3 supports a carrousel 4. The base and carrousel of the second embodiment are substantially identical to the base and carrousel described in the first embodiment.

Optical Disk Reader

An optical disk reader 8 is positioned adjacent to the carrousel, but outside of the carrousel. The optical disk reader 8 includes conventional sensors and electronics for reading an optical disk. In addition, the reader 8 includes a loading mechanism 9 that is located on a side of the reader 105 adjacent to the carrousel. The loading mechanism 9 may be formed by two substantially parallel cylinders that cooperatively rotate to move the optical disk.

The loading mechanism 9 may also include an ejector arm (not shown) that operates from within the carrousel 4 to push a disk out of the slot shown as slot 19 and into the grasp of the substantially parallel cylinders of the loading mechanism 9. The ejector arm is similar to the ejector arms 10 and 12 described in the first embodiment above. In addition, other conventional loading mechanisms may be used. Any loading mechanism that loads the disk 2 from the carrousel 4 into the reader 8 with or without use of an ejector arm will suffice.

Transfer Mechanism

The second embodiment uses a stationary transfer mechanism 205 to pass an optical disk through the center of the carrousel 4. The transfer mechanism 205 has a first loading mechanism 206 that is similar in construction to the first loading mechanism 106 of the first embodiment and a second loading mechanism 207 that is similar in construction to the second loading mechanism 107 of the first embodiment. The transfer mechanisms of the embodiment specifically described here differ from those of the first embodiment in that they function to pass an optical disk 2 only in a first direction.

Just as with the first embodiment, the first ejector arm 10 may be used to push a disk 2 from a slot of the carrousel 4 and position the disk in a position to be loaded by the first loading mechanism 206. As with the first embodiment, any loading mechanism that loads the disk 2 from the carrousel 4 into the transfer mechanism 205 with or without use of an ejector arm will suffice.

Method of Operating the Second Embodiment of the Invention

Figure 6:
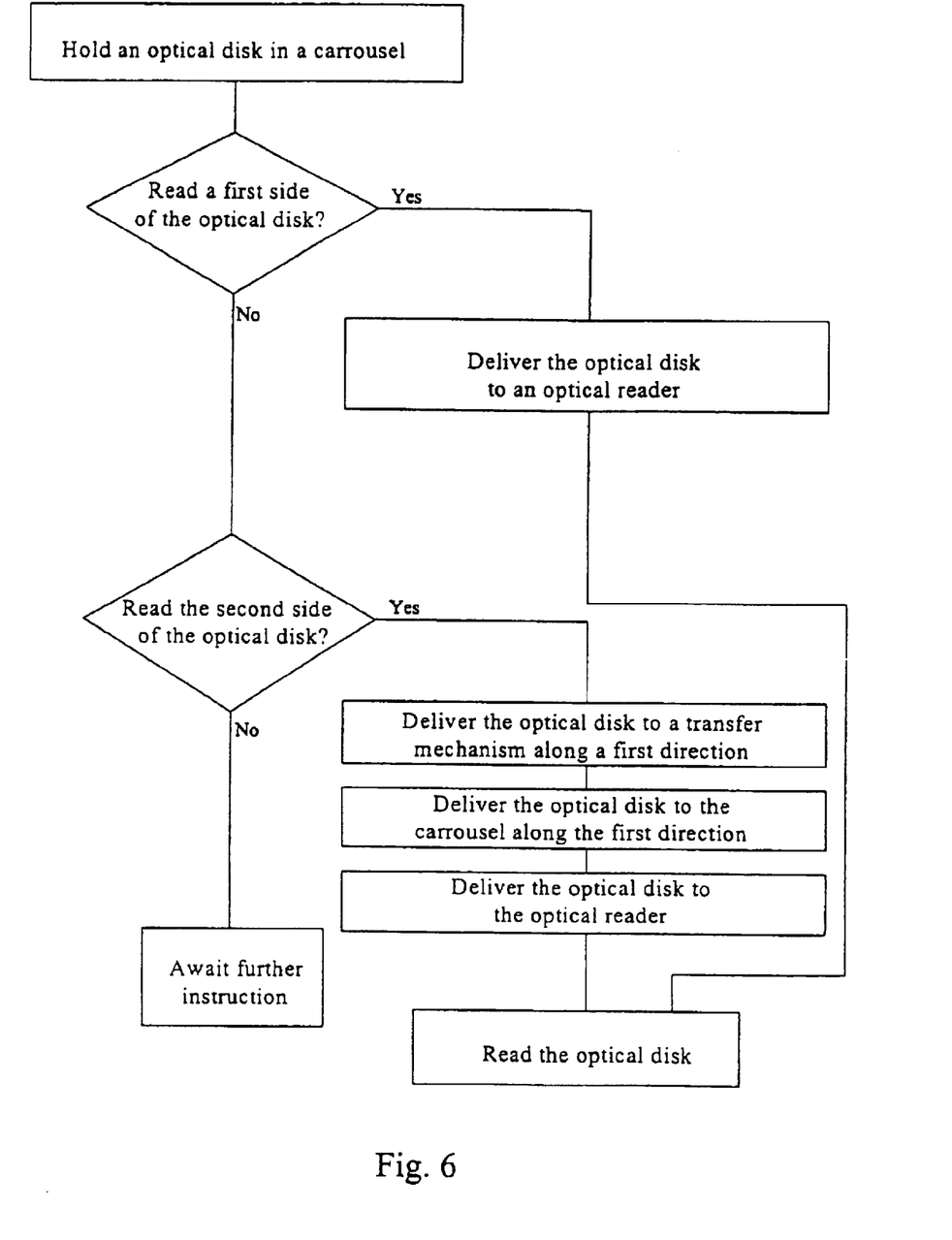
FIG. 6 is a flowchart illustrating a method of reading data from an optical disk.

Another embodiment of the invention is a method of reading data from an optical disk. This method, which is shown in FIG. 6, may be performed by the disk changer 201 shown in FIG. 2. If data from the first side of the optical disk that is held in the carrousel is to be read, the optical disk is delivered to the optical reader. This delivery may be effectuated by rotating the carrousel to align a disk with the loading mechanism of the reader then translating the disk into the reader. At this point, the data from the first side of the disk may be read. After reading, the disk may then be returned to the carrousel.

If data from the second side of the optical disk is to be read, the carrousel is rotated so that the disk is adjacent to the first loading mechanism of the transfer mechanism. The disk is delivered in a first direction to the transfer mechanism. The disk can then be held in the transfer mechanism until the carrousel is rotated to align a desired slot with the second side of the transfer mechanism. The disk is then delivered to the carrousel by employing the second loading mechanism to deliver the disk to the carrousel in the first direction. Subsequently, the carrousel is rotated to align the disk with the reader. The disk can then be loaded and data on the second side of the disk can be read.

Description of the Third Embodiment

Figure 3:
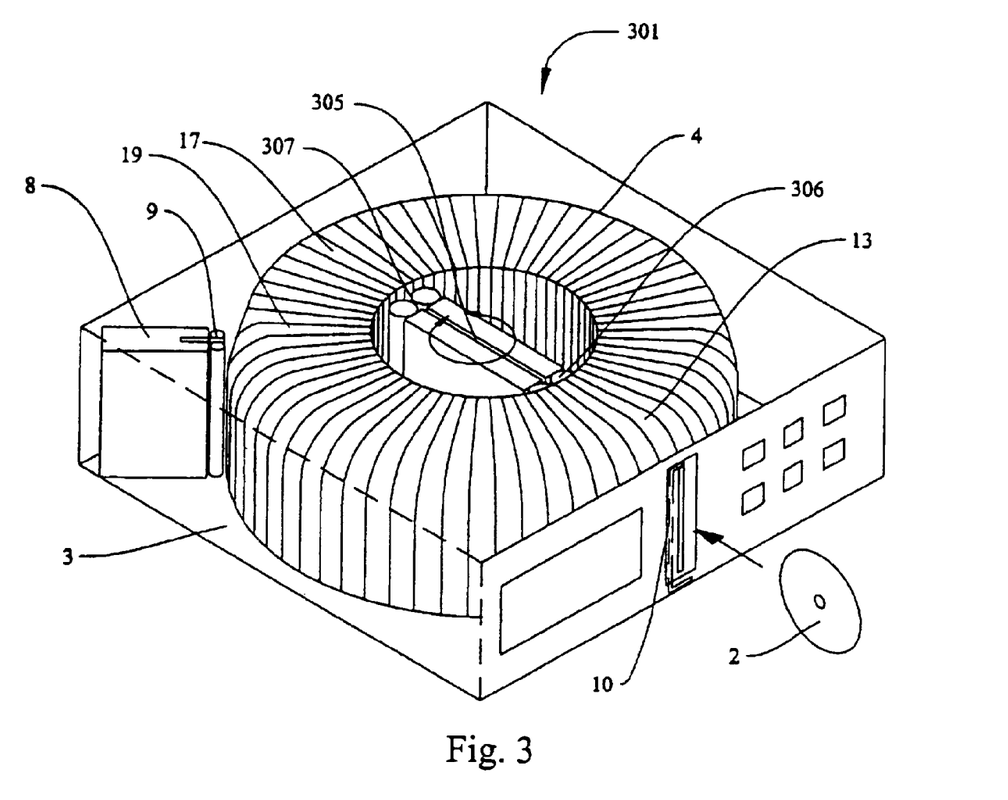
FIG. 3 is a top isometric view of an optical disk changer with a disk turner within the disk carrousel.

FIG. 3 shows an optical disk changer 301 for reading a first and a second side of an optical disk 2. As in the second embodiment, a base 3 supports a carrousel 4 and an optical disk reader S. The base, carrousel, and optical disk reader of the third embodiment are substantially similar to the base, carrousel, and optical disk reader described in the second embodiment.

Optical Disk Turner

The optical disk turner 305 includes a first loading mechanism 306 and a second loading mechanism 307 that are similar to the first loading mechanism 206 and the second loading mechanism 207 of the second embodiment. However, the optical disk turner 305 is capable of rotating about its center vertical axis relative to the base 3 and the carrousel 4.

Method of Operating the Third Embodiment of the Invention

Figure 7:
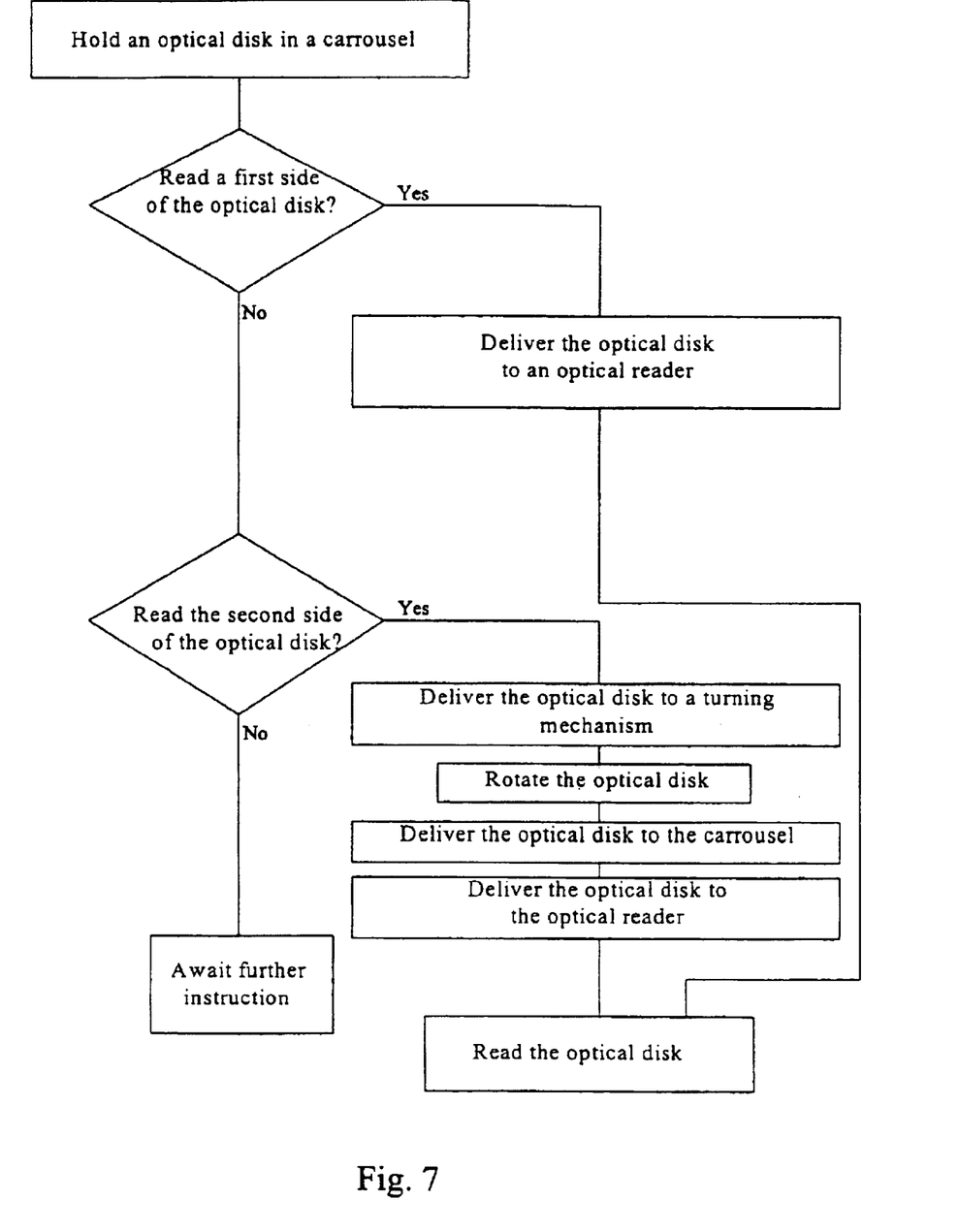
FIG. 7 is a flowchart illustrating a method of reading data from an optical disk.

Still another embodiment of the invention is a method of reading data from an optical disk. This method, which is shown in FIG. 7, may be performed by the disk changer 301 shown in FIG. 3. If data from the first side of the optical disk is to be read, the disk is delivered to the reader and played as described in the method of the second embodiment above.

However, if data from the second side of the disk is to be read, the carrousel is rotated to align the disk with the first loading mechanism of the disk turner. The disk is then delivered to the turning mechanism by translating the disk in a first direction. The disk is then rotated by the disk turner. Next, the disk is delivered to the carrousel by translating the disk in a direction opposite to the first direction.

Subsequently, the carrousel is rotated to align the disk with the reader. The disk can then be delivered to the reader and the reader can read data on the second side of the disk.

From the foregoing it will be appreciated that, although specific embodiments of the invention have been described herein for purposes of illustration, various modification may be made without deviating from the spirit and scope of the invention. Accordingly, the invention is not limited except as by the claims.

Advantages of the Invention

An advantage of some embodiments of the present invention is that they provide for fully automatic reading of dual-sided optical disks. As an increasing number of optical disks contain data on both sides of the disk, the need for automatic reading of both sides of a disk will be accentuated. For instance, a dual-sided DVD that is not automatically changed would require operator intervention at the end of the playing of the first side before the balance of the video could be viewed.

Another advantage of the invention is that with an identical storage volume the invention enables access by any automated device to twice as much digital information. To be truly automated, an automated optical disk device must necessarily be able to access all of the data stored on the disks within the automated system. With prior technology, dual-sided disks could not be accessed without operator intervention. Thus, for automatic operation, single-sided disks would be required. Therefore, with the present invention, half as much storage volume is required to effectively operate an automated optical disk device.

What is claimed is:

1. A method of handling an optical disk that has a disk rotational axis for reading data, comprising:
    (a) holding the optical disk in a carrousel;
    (b) delivering the optical disk from the carrousel to a location within the carrousel by translating the optical disk in a first direction;
    (c) rotating the optical disk about an axis that is substantially perpendicular to the disk rotational axis; and
    (d) delivering the optical disk from the location to the carrousel by translating the optical disk in a direction opposite to the first direction.

2. The method of claim 1 wherein delivering the optical disk from the carrousel to a location within the carrousel comprises delivering the optical disk to an optical disk turner positioned within the carrousel and rotating the disk comprises rotating the disk turner to flip the orientation of the optical disk with respect to the carrousel.

3. The method of claim 1 further comprising delivering the optical disk to an optical reader.

4. The method of claim 1 further comprising delivering the optical disk to an optical reader that is positioned outside the carrousel.

5. The method of claim 1 further comprising rotating the carrousel about a carrousel axis that is substantially perpendicular to the disk rotational axis when the optical disk is held in the carrousel.

6. A method of reading data from an optical disk comprising:
    (a) holding the optical disk in a carrousel;
    (b) if data from the first side of the optical disk is to be read, then delivering the optical disk to an optical reader and reading the data; and
    (c) if data from the second side of the optical disk is to be read, then:
        delivering the optical disk from the carrousel to a turning mechanism within the carrousel by driving the optical disk in a first direction with a first side of the optical disk in a first orientation with respect to the carrousel,
        rotating the disk with the turning mechanism to position the first side of the optical disk in a different second orientation with respect to the carrousel,
        delivering the optical disk from the turning mechanism to the carrousel along by driving the optical disk in a direction opposite to the first direction with the first side of the optical disk in the second orientation with respect to the carrousel,
        thereafter delivering the optical disk to the optical reader, and reading the data from the second side.

7. A method of reading data from an optical disk that has a disk rotational axis for reading the data, comprising:
    (a) holding the optical disk in a carrousel;
    (b) if data from the first side of the optical disk is to be read, then delivering the optical disk to an optical reader and reading the data; and
    (c) if data from the second side of the optical disk is to be read, then:
        delivering the optical disk to a turning mechanism,
        rotating the optical disk about an axis that is substantially perpendicular to the disk rotational axis,
        delivering the optical disk to the carrousel,
        delivering the optical disk to the optical reader, and reading the data.

8. The method of claim 7 wherein delivering the optical disk from the carrousel to a location within the carrousel comprises delivering the optical disk to an optical disk turner positioned within the carrousel and rotating the disk comprises rotating the disk turner to flip the orientation of the optical disk with respect to the carrousel.

9. The method of claim 7 further comprising delivering the optical disk to an optical reader.

10. The method of claim 7 further comprising delivering the optical disk to an optical reader that is positioned outside the carrousel.

11. The method of claim 7 further comprising rotating the carrousel about a carrousel axis that is substantially perpendicular to the disk rotational axis when the optical disk is held in the carrousel.

* * * * *

UNITED STATES PATENT AND TRADEMARK OFFICE
CERTIFICATE OF CORRECTION

PATENT NO. : 6,957,440 B2  
APPLICATION NO. : 10/727298  
DATED : October 18, 2005  
INVENTOR(S) : Dean A. Klein It is certified that error appears in the above-identified patent and that said Letters Patent is hereby corrected as shown below:

Column 6
Line 41, "disk reader S" should be --disk reader 8--;

Column 8
Line 20, "to the carrousel along by" should be --to the carrousel by--;

Signed and Sealed this

Twenty-ninth Day of August, 2006

JON W. DUDAS
*Director of the United States Patent and Trademark Office*